United States Patent
Sampath et al.

(10) Patent No.: US 7,907,958 B2
(45) Date of Patent: Mar. 15, 2011

(54) NEGOTIATED CHANNEL INFORMATION REPORTING IN A WIRELESS COMMUNICATION SYSTEM

(75) Inventors: Hemanth Sampath, San Diego, CA (US); David Jonathan Julian, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 278 days.

(21) Appl. No.: 11/454,419

(22) Filed: Jun. 16, 2006

(65) Prior Publication Data

US 2006/0287743 A1    Dec. 21, 2006

Related U.S. Application Data

(60) Provisional application No. 60/691,704, filed on Jun. 16, 2005.

(51) Int. Cl.
*H04B 7/00* (2006.01)
*H04B 1/00* (2006.01)
*H04W 72/00* (2009.01)
*H04W 4/00* (2009.01)

(52) U.S. Cl. ......... 455/509; 455/450; 455/69; 370/332; 370/333

(58) Field of Classification Search .......... 455/450, 455/452.1, 452.2, 453, 509, 67.11, 68, 69; 370/332, 333
See application file for complete search history.

(56) References Cited

U.S. PATENT DOCUMENTS

| | | | |
|---|---|---|---|
| 7,440,728 B2* | 10/2008 | Abhishek et al. | 455/41.2 |
| 2004/0266358 A1* | 12/2004 | Pietraski et al. | 455/67.11 |
| 2005/0043031 A1* | 2/2005 | Cho et al. | 455/450 |
| 2005/0143084 A1* | 6/2005 | Cheng et al. | 455/452.2 |
| 2005/0170782 A1* | 8/2005 | Rong et al. | 455/67.11 |
| 2006/0270432 A1* | 11/2006 | Dominique et al. | 455/522 |

OTHER PUBLICATIONS

International Search Report—PCT/US06/023584—International Search Authority, US—Aug. 12, 2008.
Written Opinion—PCT/US06/023584—International Search Authority, US—Aug. 12, 2008.

* cited by examiner

*Primary Examiner* — Andrew Wendell
(74) *Attorney, Agent, or Firm* — Howard Seo

(57) ABSTRACT

Techniques to enhance the performance in a wireless communication system using CQI feedback optimized to support different scenarios. According to one aspect, an access terminal may select a CQI feedback table based on the access terminals capability. According to another aspect, an access point may select a CQI feedback table based on an access terminals capability, system loading and the type of service provided by the access point. An access point which provides services that require high data rates may select a larger CQI feedback table to support the high data rates for access terminals which support the larger CQI feedback table. The same access point may select a smaller CQI feedback table for access terminals which do not have the capability or need for the high data rate services.

28 Claims, 7 Drawing Sheets

| 4-bit CQI Value | 5-bit CQI Value | FL Packet Format | Number of FL-PHY Frames | EsNo Value (dB) |
|---|---|---|---|---|
| 0 | 0 | N/A | N/A | N/A |
|   | 1 | 0 | 3 | -10.68 |
|   | 2 | 1 | 5 | -9.4 |
| 1 | 3 | 1 | 4 | -8.42 |
|   | 4 | 2 | 6 | -7.42 |
| 2 | 5 | 2 | 5 | -6.67 |
|   | 6 | 2 | 4 | -5.64 |
| 3 | 7 | 2 | 3 | -4.32 |
|   | 8 | 4 | 6 | -3.82 |
| 4 | 9 | 2 | 2 | -2.53 |
|   | 10 | 6 | 6 | -1.50 |
| 5 | 11 | 5 | 4 | -0.60 |
|   | 12 | 7 | 5 | 0.62 |
| 6 | 13 | 4 | 2 | 1.61 |
|   | 14 | 10 | 6 | 2.58 |
| 7 | 15 | 11 | 6 | 3.51 |
|   | 16 | 6 | 2 | 4.48 |
| 8 | 17 | 10 | 4 | 5.46 |
|   | 18 | 4 | 1 | 6.41 |
| 9 | 19 | 14 | 5 | 7.48 |
|   | 20 | 13 | 4 | 8.72 |
| 10 | 21 | 11 | 3 | 9.37 |
|   | 22 | 9 | 2 | 10.52 |
| 11 | 23 | 13 | 3 | 11.57 |
|   | 24 | 14 | 3 | 12.67 |
| 12 | 25 | 11 | 2 | 13.88 |
| 13 | 26 | 12 | 2 | 15.49 |
| 14 | 27 | 13 | 2 | 17.26 |
| 15 | 28 | 14 | 2 | 19.45 |
|   | 29 | N/A | N/A | N/A |
|   | 30 | N/A | N/A | N/A |
|   | 31 | N/A | N/A | N/A |

Fig. 3

NEGOTIATED CHANNEL INFORMATION REPORTING IN A WIRELESS COMMUNICATION SYSTEM

CLAIM OF PRIORITY UNDER 35 U.S.C. §119

The present Application for Patent claims priority to Provisional Application No. 60/691,704 entitled "NEGOTIATED CHANNEL INFORMATION REPORTING IN A WIRELESS COMMUNICATION SYSTEM" filed Jun. 16, 2005, and assigned to the assignee hereof and hereby expressly incorporated by reference herein.

BACKGROUND

1. Field

The present description relates generally to wireless communication and more specifically to feedback of channel quality information (CQI) in a wireless communication system.

2. Background

An orthogonal frequency division multiple access (OFDMA) system utilizes orthogonal frequency division multiplexing (OFDM). OFDM is a multi-carrier modulation technique that partitions the overall system bandwidth into multiple (N) orthogonal frequency subcarriers. These subcarriers may also be called tones, bins, and frequency channels. Each subcarrier is associated with a respective sub carrier that may be modulated with data. Up to N modulation symbols may be sent on the N total subcarriers in each OFDM symbol period. These modulation symbols are converted to the time-domain with an N-point inverse fast Fourier transform (IFFT) to generate a transformed symbol that contains N time-domain chips or samples.

In a frequency hopping communication system, data is transmitted on different frequency subcarriers during different time intervals, which may be referred to as "hop periods." These frequency subcarriers may be provided by orthogonal frequency division multiplexing, other multi-carrier modulation techniques, or some other constructs. With frequency hopping, the data transmission hops from subcarrier to subcarrier in a pseudo-random manner. This hopping provides frequency diversity and allows the data transmission to better withstand deleterious path effects such as narrow-band interference, jamming, fading, and so on.

Feedback of Channel Quality Indicator (CQI), e.g. channel information in a MIMO system is generally more challenging than CQI feedback for SISO systems. For SISO users, the CQI is computed at the access terminal (AT), using pilots sent over a dedicated control or signaling channel (FL-CTRL) or a data channel (FL-data). The CQI is fedback using a dedicated resource of a reverse link signaling or control channel (RL-CTRL).

Existing CQI feedback schemes assume a CQI table with a deterministic mapping scheme between the quantized CQI values and the packet-formats that can be supported by the AT. However, future wireless systems will support ATs with different capabilities (laptops, low-cost cell-phones, PCs, PDAs etc). This provides a great range of CQI quantization possibilities and thus increases the complexity of the feedback required. Furthermore, the deployments of next-generation wireless systems can vary hot-spots, partially loaded systems, fully loaded systems etc. Further, the different access points may vary from being configured for SISO to MIMO operation. Each of the scenarios generally requires different gradations of CQI quantization, and this further increases the complexity of the CQI feedback.

Thus, there exists a need in the art for a system and/or a methodology to optimize CQI feedback for different scenarios while at the same time maintaining the possibility of supporting the different scenarios.

SUMMARY

The following presents a simplified overview or summary of one or more embodiments in order to provide a basic understanding of such embodiments. This summary is not intended to be an extensive overview of all contemplated embodiments, and it is not intended to identify key or critical elements of all embodiments nor is it intended to delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with enhancing performance in a wireless communication system by optimizing CQI feedback for different scenarios while at the same time maintaining the possibility of supporting the different scenarios. According to one aspect, a method for determining and providing feedback information, can comprise receiving an indicator identifying at least one feedback table to use, where a feedback table is used for quantizing channel information, selecting a feedback table, from at least one feedback table, where selecting is determined at least in part by the received indicator, and transmitting the information associated with the feedback table.

According to another aspect the method can also comprise broadcasting a type of one or more of the at least one feedback table, wherein the received indicator may be determined by the type of feedback table broadcast. In addition, the method can be used for providing a range of signal-to-noise ratios, wherein each of the at least one feedback tables comprises a range of signal-to-noise ratios each range corresponding to a feedback value. The method can also be used for providing information regarding a forward link channel quality, wherein each of the at least one feedback tables includes information indicative of a forward link channel quality as well as providing information regarding a data transmission format, wherein each of the at least one feedback tables includes information that may be utilized to determine a packet format appropriate for data transmission. The method may also include transmitting a feedback table indicator, wherein the feedback table indicator comprises at least one bit, and a feedback table comprising a smaller number of entries contains less quantizing channel information compared to a feedback table comprising a larger number of entries. In yet another aspect the method can comprise determining a system loading, wherein the selection of the feedback table is further a function of system loading, determining the capability of an access terminal, wherein the selection of the feedback table is further a function the capability of an access terminal transmitting the indicator. The method may also comprise determining a reverse link capacity, wherein the selection of the feedback table is further a function of the reverse link capacity, and determining the reverse link capacity utilizing a reverse link control channel capacity metric. In the methods discussed the feedback table can be a CQI table.

According to another aspect, when the determination indicates that the at least one feedback table identified by the at least one second received indicator is not one of the at least one feedback table identified by the at least one first transmitted indicator the method may include transmitting at least one first indicator identifying at least one feedback table from a plurality of feedback tables for quantizing channel information, receiving at least one second indicator identifying at least one feedback table, determining based at least upon whether the at least one feedback table identified by the at least one second indicator is one of the at least one feedback table identified by the at least one first indicator, electing a feedback table from the plurality of feedback tables based on the determination, and transmitting information associated with the selected feedback table. The method may also comprise transmitting at least one additional indicator identifying at least one feedback table from a plurality of feedback tables for quantizing channel information, receiving at least one additional indicator identifying at least one feedback table, determining whether the at least one feedback table identified by the at least one additional received indicator is one of the at least one feedback table identified by the at least one additional transmitted indicator, and selecting a feedback table from the plurality of the feedback tables based on the determination associated with the additional transmitted and received indicators. The method may include determining a decoding complexity of an access point wherein the selection of the feedback table is further a function of the access point decoding complexity.

BRIEF DESCRIPTION OF THE DRAWINGS

The features, nature, and advantages of the present embodiments may become more apparent from the detailed description set forth below when taken in conjunction with the drawings in which like reference characters identify correspondingly throughout and wherein:

FIG. 3 illustrates a CQI table.

DETAILED DESCRIPTION

Figure 1:
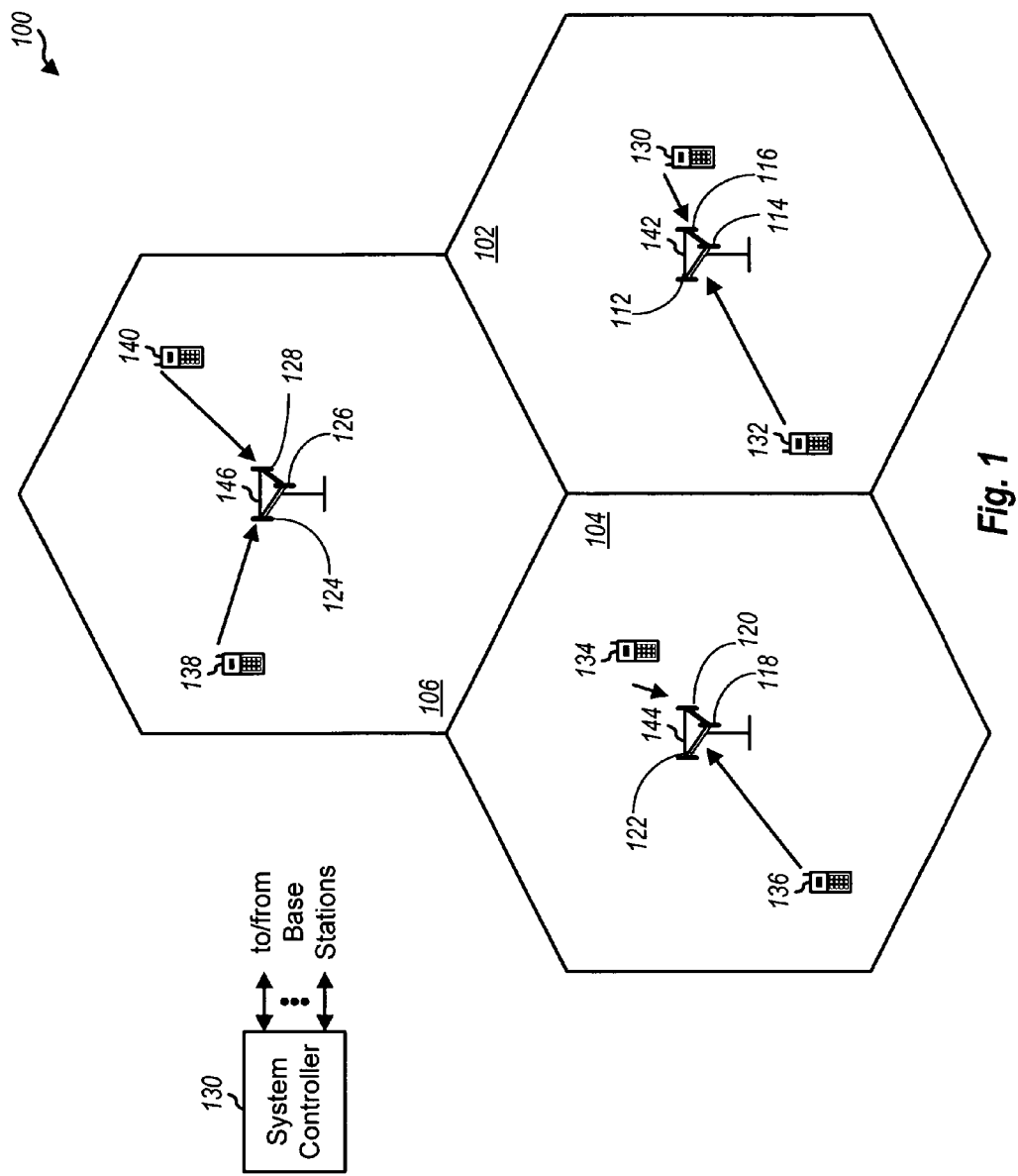
FIG. 1 illustrates aspects of a multiple access wireless communication system according to an embodiment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a user device. A user device can also be called a system, a subscriber unit, subscriber station, mobile station, mobile device, remote station, access point, base station, remote terminal, access terminal, user terminal, terminal, user agent, or user equipment. A user device can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Referring to FIG. 1, a multiple access wireless communication system according to one embodiment is illustrated. A multiple access wireless communication system 100 includes multiple cells, e.g. cells 102, 104, and 106. In the embodiment of FIG. 1, each cell 102, 104, and 106 may include an access point 150 that includes multiple sectors. The multiple sectors may be formed by groups of antennas each responsible for communication with access terminals in a portion of the cell. In cell 102, antenna groups 112, 114, and 116 each correspond to a different sector. In cell 104, antenna groups 118, 120, and 122 each correspond to a different sector. In cell 106, antenna groups 124, 126, and 128 each correspond to a different sector.

Each cell includes several access terminals which may be in communication with one or more sectors of each access point. For example, access terminals 130 and 132 are in communication base station 142, access terminals 134 and 136 are in communication with access point 144, and access terminals 138 and 140 are in communication with access point 146.

It can be seen from FIG. 1 that each access terminal 130, 132, 134, 136, 138, and 140 is located in a different portion of it respective cell relative to each other access terminal in the same cell. Further, each access terminal may be a different distance from the corresponding antenna groups with which it is communicating. Both of these factors provide situations, due to environmental and other conditions in the cell, which cause different channel conditions to be present between each access terminal and the corresponding antenna group with which it is communicating.

In certain aspects, each access terminal 130, 132, 134, 136, 138, and 140 may negotiate a feedback scheme, e.g. a CQI table that it will utilize to provide feedback for providing channel state information to the access point. In some aspects, this may be by selecting one or more feedback tables, or equivalents thereto, received via an over the air message from the access point. In other aspects, it may be a communication session between the access point and the access terminal after registration with the access point.

As used herein, a CQI table may encompass any set of information that may be used to associate an indicator to sets of values indicative of channel conditions.

As used herein, an access point may be a fixed station used for communicating with the terminals and may also be referred to as, and include some or all the functionality of a base station. An access terminal may also be referred to as, and include some or all the functionality of, a user equipment (UE), a wireless communication device, a terminal, a mobile station or some other terminology.

Figure 2:
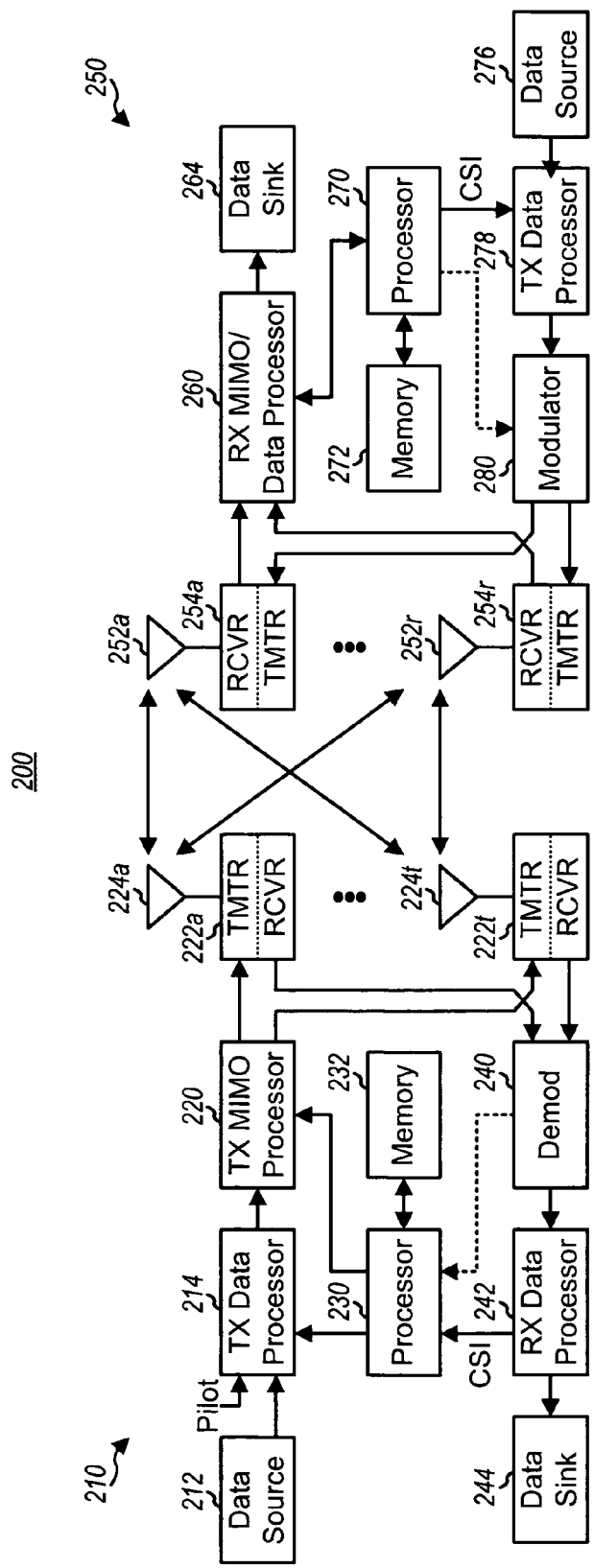
FIG. 2 illustrates aspects of a transmitter and receiver in a multiple access wireless communication system.

Referring to FIG. 2, one embodiment of a transmitter and receiver in a multiple access wireless communication system is illustrated, 200. At transmitter system 210, traffic data for a number of data streams is provided from a data source 212 to a transmit (TX) data processor 214. In an embodiment, each data stream is transmitted over a respective transmit antenna. TX data processor 214 formats, codes, and interleaves the traffic data for each data stream based on a particular coding scheme selected for that data stream to provide coded data. In some embodiments, TX data processor 214 applies preceding weights to the symbols of the data streams based upon the user and the antenna from which the symbols are being transmitted. In some embodiments, the preceding weights may be generated based upon an index to a codebook generated at the transceiver, 254 and provided as feedback to the transceiver, 222 which has knowledge of the codebook and its indices. Further, in those cases of scheduled transmissions, the TX data processor 214 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230. As discussed above, in some embodiments, the packet format for one or more streams may be varied according to the rank information that is transmitted from the user.

The modulation symbols for all data streams are then provided to a TX MIMO processor 220, which may further process the modulation symbols (e.g., for OFDM). TX MIMO processor 220 then provides $N_T$ modulation symbol streams to $N_T$ transceivers (TMTR) 222a through 222t. In certain embodiments, TX MIMO processor 220 applies precoding weights to the symbols of the data streams based upon the user to which the symbols are being transmitted to and the antenna from which the symbol is being transmitted from that user channel response information.

Each transceiver, 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 222a through 222t are then transmitted from $N_T$ antennas 224a through 224t, respectively.

At receiver system 250, the transmitted modulated signals are received by NR antennas 252a through 252r and the received signal from each antenna 252 is provided to a respective transceiver, (RCVR) 254. Each transceiver, 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ transceivers 254 based on a particular receiver processing technique to provide $N_T$ "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRs) of the detected symbol streams, and possibly other channel characteristics, and provides these quantities to a processor 270. RX data processor 260 or processor 270 may further derive an estimate of the "operating" SNR for the system. Processor 270 then provides estimated (CSI), which may comprise various types of information regarding the communication link and/or the received data stream. For example, the CSI may comprise only the operating SNR. The CSI is then processed by a TX data processor 278, which also receives traffic data for a number of data streams from a data source 276, modulated by a modulator 280, conditioned by transceivers 254a through 254r, and transmitted back to transmitter system 210.

In addition, processor 270 may select the index(ces) or entry(ies) that correspond to the matrix(ces) or vector(s) that provide indications of some desired channel conditions, e.g. SNR, for the transceiver 254 based upon the signals received by the receiver. Processor 270 can quantize the index or entry according to a feedback table, e.g. a CQI table that is known at transceiver 222. In some embodiments, as described with respect to FIG. 2 five-bit codes may be utilized allowing a wide range of channel conditions. The codebook size and entries can vary per device, per sector, per cell, or per system and may be updated over time based upon communication conditions, system updates, or the like. As discussed with respect to FIG. 1, the feedback table that is utilized may be obtained by negotiation or selected from a broadcast message.

At transmitter system 210, the modulated signals from receiver system 250 are received by antennas 224, conditioned by receivers 222, demodulated by a demodulator 240, and processed by a RX data processor 242 to recover the CSI reported by the receiver system. The reported quantized information e.g. CQI is then provided to processor 230 and used to (1) determine the data rates and coding and modulation schemes to be used for the data streams and (2) to generate various controls for TX data processor 214 and TX MIMO processor 220.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial subchannel (or a transmission channel) of the MIMO channel and corresponds to a dimension.

For a full-rank MIMO channel, where $N_S = N_T \leq N_R$, an independent data stream may be transmitted from each of the $N_T$ transmit antennas. The transmitted data streams may experience different channel conditions (e.g., different fading and multipath effects) and may achieve different signal-to-noise-and-interference ratios (SNRs) for a given amount of transmit power. Moreover, in those cases that successive interference cancellation processing is used at the receiver to recover the transmitted data streams, and then different SNRs may be achieved for the data streams depending on the specific order in which the data streams are recovered. Consequently, different data rates may be supported by different data streams, depending on their achieved SNRs. Since the channel conditions typically vary with time, the data rate supported by each data stream also varies with time.

In some aspects, the CQI may be transmitted on a Code Division Multiplexed (CDM) channel and as a result the number of CQIs which can be sent is limited by the number of available codes. Thus, when a system is partially loaded, there are codes available to be used as a CQI, and when the system is fully loaded there are may be no codes which may be used as a CQI available. Thus, by using the codes available on a partially loaded system a precoding gain is achievable by dividing the available bandwidth, performing frequency hopping on the divided portions, reporting a channel quality index for each divided portion, and using the CQI in such a manner as to improve the precoding and also reduce the overhead required for preceding.

CQI reporting may be done for each spatial subchannel, may be combined over multiple spatial subchannels, per frequency subcarrier, or combined for groups of frequency subcarries.

Referring to FIG. 3, the table illustrates CQI mapping to the Forward Link (FL) Packet Format and Number of Forward Link Physical Frames. FIG. 3 illustrates the use of a 4-bit CQI value and use of a 5-bit CQI value. In an aspect, 4-bit CQI values are used for Single-Input-Multiple-Output (SIMO), and 5-bit CQI values are used with Multiple-Input-Multiple-Output (MIMO). An AT measures the Forward Link (FL) channel quality and determines a signal to noise ratio, e.g. $E_s/N_o$ value. The AT then does a lookup to quantize the CQI value which represents the signal to noise ratio. The AT transmits the CQI value to the Access Point (AP), and the AP does a table lookup to get the $E_s/N_o$ value. Now the AP knows the FL channel quality, and based on the FL channel quality the AP knows which packet formats are supported for the next transmission or transmissions.

In one embodiment, an AP may maintain 10 CQI tables, and an AT may negotiate with an AP as to which CQI table to use. For example, in the case of an AT which supports 4 packet formats, it may be most efficient to use a 2-bit CQI value. In this scenario, an AT that can use a 2-bit CQI value, the coding and decoding complexity is decreased and Reverse Link (RL) capacity is improved. In an embodiment, a RL control channel capacity metric may be used to indicate the RL capacity. Also, in an embodiment, an AP decode complexity metric may be used to indicate the coding and decoding complexity of an AP. On the other hand, an AT which supports 64 packet formats may request a higher resolution CQI value, for example a 6-bit CQI value. The higher packet formats supports high data rates, and benefits from users using less resources such as time frequency resources.

Figure 4:
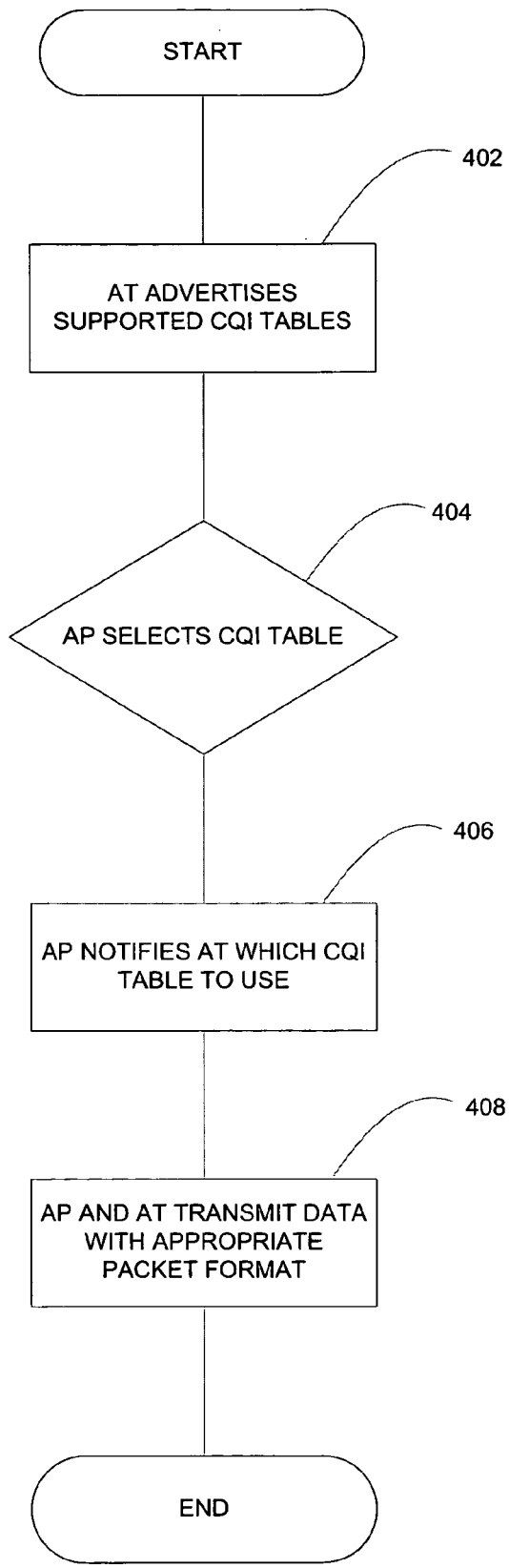
FIG. 4 illustrates a methodology for selecting a CQI table.

Referring to FIG. 4, in an embodiment, an AP may maintain a plurality of CQI tables, and an AT may maintain one or more CQI tables based on the AT's capabilities. The AT may advertise, through the Reverse Link (RL), to the AP the CQI tables the AT supports, 402. The AP then selects a CQI table to use based on the CQI tables supported by the AT, 404. The AP may inform the AT of the CQI table selected or the selection may be implicit, 406. The AP and the AT begin transmitting data using a packet format appropriate for the FL channel, 408. The AP may select a CQI table solely on the AT's capability. Also, for example, in the case of an AT that supports more than one CQI table, other factors such as system loading where system loading is determined by how much of the systems resources are being utilized. By using other factors along with the CQI tables supported by the AT, the network can optimize the performance of the AT's served by the AP.

Figure 5:
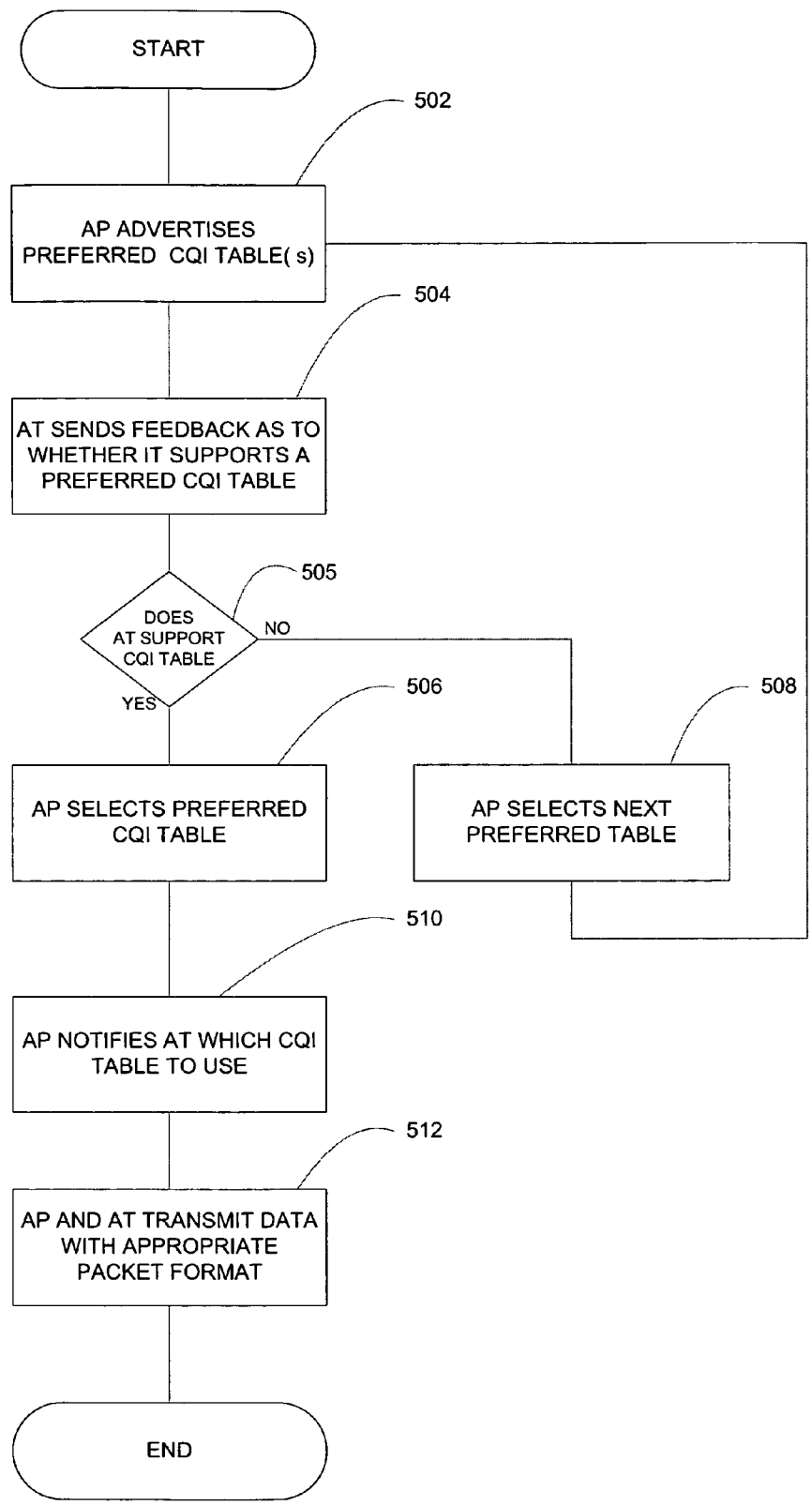
FIG. 5 illustrates another methodology for selecting a CQI table.

Referring to FIG. 5, in another embodiment the selection of a CQI table may be deployment specific. In such an embodiment this may occur when an AP that serves a hot-spot or supports high packet format applications and services. The AP may advertise one preferred CQI table or several preferred CQI tables, 502. In some cases and the AP may advertise several preferred CQI tables in order of preference or based on the application to be used by the AT. If the AT supports a CQI table preferred by the AP, the AT will notify the AP of one or more preferred CQI table it supports, 504. If the AT does not support one or more CQI tables advertised by the AP, 505, the AP may select its next preferred CQI table or tables, 508. The AP would then advertise its next preferred CQI table, 502. If the AT does support the CQI table, 505, the AP selects the preferred CQI table, 506, notifies the AT which CQI table to use, 510, and the AP and AT may begin transmitting data with the appropriate packet format 512. Alternatively, the AP may direct the AT of the CQI table to use, 510. All AT(s) that support a high packet format may use a CQI table as desired by the AP to optimize the performance between the AP(s) and AT(s).

In yet another embodiment, the AP(s) may use the AT capability, system conditions, such as system loading, and type of deployment to advertise and/or decide which CQI table to use. Using these factors, the AP(s) may dynamically select which CQI table(s) to use to optimize performance between the AP(s) and AT(s). In another embodiment, the AP may simply send a high or low command to instruct the AT to use a high packet format or a low packet format. This may be useful for a heavily loaded AP.

Figure 6:
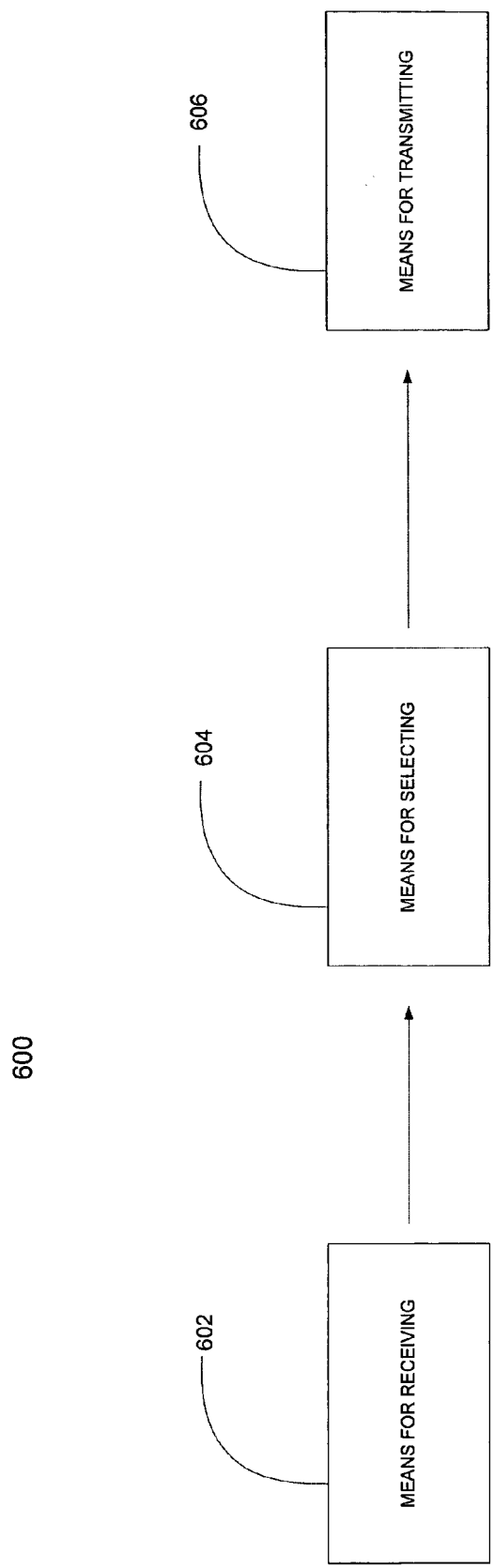
FIG. 6 illustrates a functional block diagram for selecting a CQI table.

Referring to FIG. 6, a functional block diagram for selecting a feedback table 600 is illustrated. An indicator identifying at least one feedback table to use is received by the means for receiving, 602. The means for selecting, 604, selects a feedback table, from at least one feedback table, for quantizing channel information, wherein selecting is determined at least in part by the received indicator. The indicator is then transmitted by the means for transmitting, 606.

Figure 7:
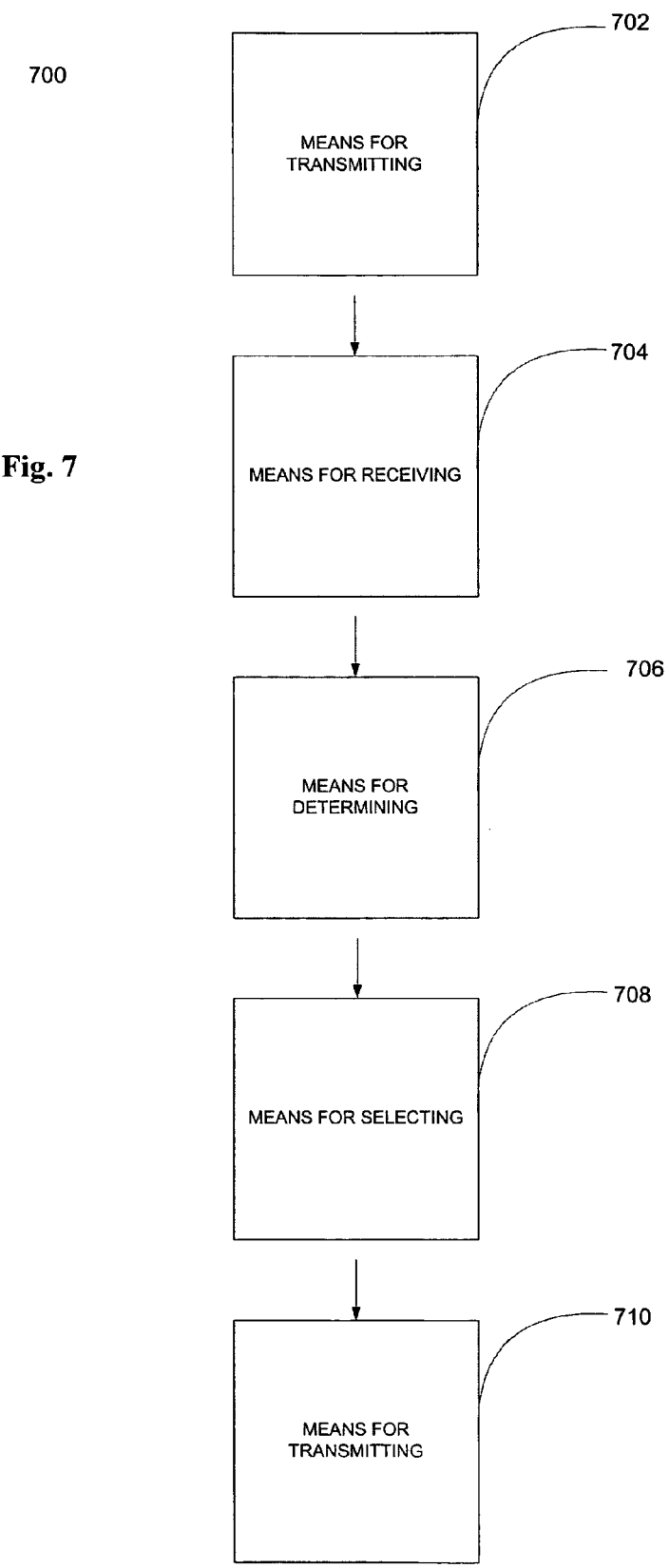
FIG. 7 illustrates a functional block diagram for selecting a CQI table.

Referring to FIG. 7, a functional block diagram for selecting a feedback table 700 is illustrated. At least one first indicator identifying at least one feedback table from a plurality of feedback tables for quantizing channel information is transmitted by the means for transmitting, 702. At least one second indicator identifying at least one feedback table is received by the means for receiving, 704. A determination based at least upon whether the at least one feedback table identified by the at least one second indicator is one of the at least one feedback table identified by the at least one first indicator is made by the means for determining, 706. A selection of a feedback table from the plurality of feedback tables based on the determination is provided by the means for selecting, 708. The information associated with the selected feedback table is transmitted by the means for transmitting, 710. The means for transmitting, 710, may also be the same means for transmitting, 702.

The word "exemplary" is used herein to mean "serving as an example, instance, or illustration." Any embodiment described herein as "exemplary" is not necessarily to be construed as preferred or advantageous over other embodiments.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for determining feedback information to be provided, comprising:
   receiving an indicator identifying at least one feedback table to use;
   selecting a feedback table, from a plurality of feedback tables, for quantizing channel information, wherein selecting is determined at least in part by the received indicator and a number of supported packet formats, and wherein each feedback table maps each of a plurality of values indicative of channel conditions to a quantized channel quality information value and a packet format;
   determining a channel condition value;
   quantizing the channel condition value to a quantized channel quality information value based in part on the selected feedback table;
   transmitting the quantized channel information value; and
   receiving a data packet of a packet format determined based at least in part on a packet format in the selected feedback table that corresponds to the quantized channel information value.

2. The method of claim 1, further comprising:
   broadcasting a type of one or more of the plurality of feedback tables, wherein the received indicator may be determined by the type of feedback table broadcast.

3. The method of claim 1, further comprising:
   providing a range of signal-to-noise ratios, wherein each of the plurality of feedback tables comprises a range of signal-to-noise ratios each range corresponding to a feedback value.

4. The method of claim 1, further comprising:
   providing information regarding a forward link channel quality, wherein each of the plurality of feedback tables includes information indicative of a forward link channel quality.

5. The method of claim 1, further comprising:
   transmitting a feedback table indicator, wherein the feedback table indicator comprises at least one bit.

6. The method of claim 5, wherein a feedback table comprising a smaller number of entries contains less quantizing channel information compared to a feedback table comprising a larger number of entries.

7. The method of claim 1, determining a system loading, wherein the selection of the feedback table is further a function of system loading.

8. The method of claim 1, further comprising:
   determining a capability of an access terminal, wherein the selection of the feedback table is further a function the capability of an access terminal transmitting the indicator.

9. The method of claim 1, further comprising:
   determining a reverse link capacity, wherein the selection of the feedback table is further a function of reverse link capacity.

10. The method of claim 9, further comprising:
    determining the reverse link capacity utilizing a reverse link control channel capacity metric.

11. The method of claim 1, wherein each of the at least one feedback tables is a CQI table.

12. A method for providing information comprising:
transmitting at least one first indicator identifying at least one feedback table from a plurality of feedback tables for quantizing channel information, and wherein each feedback table maps each of a plurality of values indicative of channel conditions to a quantized channel quality information value and a packet format;
receiving at least one second indicator identifying at least one feedback table;
determining based at least upon whether the at least one feedback table identified by the at least one second indicator is one of the at least one feedback table identified by the at least one first indicator;
selecting a feedback table from the plurality of feedback tables based on the determination;
transmitting information associated with the selected feedback table;
observing channel conditions; and
receiving a data packet of a packet format that is chosen from the selected feedback table based on a mapping in the selected feedback table between observed channel conditions and the packet format.

13. The method of claim 12, wherein the determination indicates that the at least one feedback table identified by the at least one second received indicator is not one of the at least one feedback table identified by the at least one first transmitted indicator, said method further comprising:
transmitting at least one additional indicator identifying at least one feedback table from a plurality of feedback tables for quantizing channel information;
receiving at least one additional indicator identifying at least one feedback table; and
determining whether the at least one feedback table identified by the at least one additional received indicator is one of the at least one feedback table identified by the at least one additional transmitted indicator, wherein the selection further comprises:
selecting a feedback table from the plurality of the feedback tables based on the determination associated with the additional transmitted and received indicators.

14. The method of claim 12, further comprising:
providing information regarding a forward link channel quality, wherein each of the at least one feedback tables from a plurality of feedback tables includes information indicative of a forward link channel quality.

15. The method of claim 12, further comprising:
providing a range of signal-to-noise ratios, wherein at least one feedback tables from a plurality of feedback tables comprises a range of signal-to-noise ratios.

16. The method of claim 12, further comprising:
providing information regarding a data transmission format, wherein each of the at least one feedback tables from a plurality of feedback tables includes information that may be utilized to determine a packet format appropriate for data transmission.

17. The method of claim 12, wherein the feedback table includes information indicative of a forward link channel quality each range corresponding to a feedback value.

18. The method of claim 12, further comprising:
transmitting a feedback table indicator, wherein the feedback table indicator comprises at least one bit.

19. The method of claim 18, wherein a feedback table comprising a smaller number of entries contains less quantizing channel information compared to a feedback table comprising a larger number of entries.

20. The method of claim 12, further comprising:
determining a decoding complexity of an access point wherein the selection of the feedback table is further a function of the access point decoding complexity.

21. The method of claim 12, further comprising:
determining a reverse link capacity; wherein the selection of the feedback table is further a function of reverse link capacity.

22. The method of claim 12, further comprising:
determining the reverse link capacity utilizing a reverse link control channel capacity metric.

23. The method of claim 12, wherein each of the at least one feedback tables from a plurality of feedback tables is a CQI table.

24. A wireless communication apparatus comprising:
a receiver configured to receive an indicator identifying at least one feedback table;
a processor configured to select a feedback table from a plurality of feedback tables for quantizing channel information, wherein the selection is determined at least in part by the received indicator and a number of supported packet formats, and wherein each feedback table maps each of a plurality of values indicative of channel conditions to a quantized channel quality information value and a packet format; and
a transmitter configured to transmit information associated with the selected feedback table.

25. A wireless communication apparatus comprising:
a transmitter configured to transmit at least one first indicator identifying at least one feedback table from a plurality of feedback tables for quantizing channel information, wherein each feedback table maps each of a plurality of values indicative of channel conditions to a quantized channel quality information value and a packet format;
a receiver configured to receive at least one second indicator identifying at least one feedback table;
a processor configured to determine, based at least upon, a number of supported packet formats and whether the at least one feedback table identified by the at least one second indicator is one of the at least one feedback table identified by the at least one first indicator;
wherein the processor is configured to select a feedback table from the plurality of feedback tables based on the determination; and
wherein the transmitter is configured to transmit information associated with the selected feedback table.

26. A wireless communication apparatus comprising:
means for receiving an indicator identifying at least one feedback table to use;
means for selecting a feedback table, from a plurality of feedback tables, for quantizing channel information, wherein selecting is determined at least in part by the received indicator and a number of supported packet formats, and wherein each feedback table maps each of a plurality of values indicative of channel conditions to a quantized channel quality information value and a packet format;
means for transmitting information associated with the selected feedback table;
means for observing channel conditions; and
means for receiving a data packet of a packet format that is chosen from the selected feedback table based on a mapping in the selected feedback table between observed channel conditions and the packet format.

27. A wireless communication apparatus comprising:
means for transmitting at least one first indicator identifying at least one feedback table from a plurality of feedback tables for quantizing channel information, and wherein each feedback table maps each of a plurality of values indicative of channel conditions to a quantized channel quality information value and a packet format;
means for receiving at least one second indicator identifying at least one feedback table;
means for determining based at least upon a number of supported packet formats and whether the at least one feedback table identified by the at least one second indicator is one of the at least one feedback table identified by the at least one first indicator;
means for selecting a feedback table from the plurality of feedback tables based on the determination;
means for transmitting information associated with the selected feedback table;
means for observing channel conditions; and
means for receiving a data packet of a packet format that is chosen from the selected feedback table based on a mapping in the selected feedback table between observed channel conditions and the packet format.

28. A method for determining feedback information to be provided, the method comprising:
transmitting to an access point an advertisement of at least one Channel Quality Information (CQI) table from a plurality of CQI tables supported by an access terminal, wherein each CQI table includes a plurality of CQI values, each CQI value mapped to a measure of forward link channel quality and a forward link packet format;
receiving, from the access point, an identifier for a CQI table from the plurality of CQI tables;
selecting the CQI table based on the identifier;
transmitting a CQI value from the selected CQI table based on a measured forward link channel quality; and
receiving a forward link data packet having a data format that is chosen from the selected CQI table based on a mapping in the selected CQI table between the transmitted CQI value and the data format.

* * * * *